United States Patent
Axmon et al.

(10) Patent No.: US 11,234,234 B2
(45) Date of Patent: Jan. 25, 2022

(54) CLUSTERED PERIODIC GAPS FOR MEASUREMENTS IN A HETEROGENEOUS NETWORK

(71) Applicant: Telefonaktiebolaget L M Ericsson (publ), Stockholm (SE)

(72) Inventors: Joakim Axmon, Kävlinge (SE); Muhammad Kazmi, Bromma (SE); Torgny Palenius, Barsebäck (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 14/911,382

(22) PCT Filed: Jan. 24, 2014

(86) PCT No.: PCT/SE2014/050088
§ 371 (c)(1),
(2) Date: Feb. 10, 2016

(87) PCT Pub. No.: WO2015/023222
PCT Pub. Date: Feb. 19, 2015

(65) Prior Publication Data
US 2016/0192339 A1 Jun. 30, 2016

Related U.S. Application Data

(60) Provisional application No. 61/864,930, filed on Aug. 12, 2013.

(51) Int. Cl.
*H04W 72/04* (2009.01)
*H04W 24/10* (2009.01)
(Continued)

(52) U.S. Cl.
CPC ........ *H04W 72/044* (2013.01); *H04B 17/318* (2015.01); *H04W 24/10* (2013.01);
(Continued)

(58) Field of Classification Search
None
See application file for complete search history.

(56) References Cited

U.S. PATENT DOCUMENTS 8,451,757 B2 * 5/2013 Lee .................. H04W 36/0088
370/310
9,167,416 B2 * 10/2015 Kim .......................... H04L 5/14
(Continued)

FOREIGN PATENT DOCUMENTS

WO 2012146274 A1 11/2012

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.8.0, Dec. 2013, 1-209.
(Continued)

*Primary Examiner* — Robert C Scheibel
(74) *Attorney, Agent, or Firm* — Sage Patent Group

(57) ABSTRACT

Techniques for configuring and using measurement gap patterns for offloading purposes are disclosed. An example method, performed in a network node of a wireless communication network, includes selecting (410) a measurement gap pattern to be used by the mobile terminal, the measurement gap pattern having a series of measurement gap bursts such that the measurement gap bursts are separated by a repetition period and each measurement gap burst comprises two or more measurement gaps, and signaling (420) the measurement gap pattern to the mobile terminal. In some embodiments, the repetition period is chosen so that the measurement gap pattern repetition period and the long-DRX cycle length in some embodiments are related to each other by an integer power of N.

17 Claims, 6 Drawing Sheets

(51) Int. Cl.
*H04W 76/28* (2018.01)
*H04B 17/318* (2015.01)
*H04W 36/00* (2009.01)

(52) U.S. Cl.
CPC ........ *H04W 76/28* (2018.02); *H04W 36/0088* (2013.01); *Y02D 30/70* (2020.08)

(56) References Cited

U.S. PATENT DOCUMENTS

| | | |
|---|---|---|
| 2012/0178465 A1 | 7/2012 | Lin et al. |
| 2013/0059610 A1 | 3/2013 | Siomina et al. |
| 2013/0107742 A1 | 5/2013 | Ishii et al. |
| 2013/0107743 A1 | 5/2013 | Ishii et al. |
| 2014/0044003 A1* | 2/2014 | Drazynski ............. H04W 24/10 370/252 |
| 2016/0044541 A1* | 2/2016 | Lunden ................ H04W 48/20 370/252 |
| 2017/0245239 A1* | 8/2017 | Kazmi ................ H04W 64/003 |

OTHER PUBLICATIONS

3GPP, "3rd Generation Partnership Project; Technical Specification Group Radio Access Network; Evolved Universal Terrestrial Radio Access (E-UTRA); Medium Access Control (MAC) protocol specification (Release 11)", 3GPP TS 36.321 V11.4.0, Dec. 2013, 1-57.

3GPP, "3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.6.0, Dec. 2013, 1-349.

3GPP, "3rd Generation Partnership Project; Technical Specification Group Radio Access Network; Evolved Universal Terrestrial Radio Access (E-UTRA); Requirements for support of radio resource management (Release 11)", 3GPP TS 36.133 V11.7.0, Dec. 2013, 1-790.

Unknown, Author, "Heterogeneous Network Deployment Scenarios", Ericsson, ST-Ericsson, 3GPP TSG-RAN WG1 #70bis, R1-124513, San Diego, CA, USA, Oct. 8-12, 2012, 1-3.

Unknown, Author, "Initial considerations on Heterogeneous Networks for UMTS", Ericsson, ST-Ericsson, 3GPP TSG RAN WG1 Meeting #70bis, R1-124512, San Diego, CA, USA, Oct. 8-12, 2012, pp. 1-7.

Unknown, Author, "LS on relaxed performance requirement", 3GPP TSG RAN WG2 Meeting #82, R2-132239, Fukuoka, Japan, May 20-24, 2013, 1-2.

Unknown, Author, "Proposed SID: Study on UMTS Heterogeneous Networks", Huawei, HiSilicon, TSG RAN Meeting #57, RP-121436, Chicago, USA, Sep. 4-7, 2012, 1-5.

3GPP, "3rd Generation Partnership Project; Technical Specification Group Radio Access Network; Evolved Universal Terrestrial Radio Access (E-UTRA); Requirements for support of radio resource management (Release 8)", 3GPP TS 36.133 V8.23.0, Sections 7.6.2.2-8.1.2.1.1, Sep. 2013, 41-42.

Unknown, Author, "Discussion on gap enhancement", Huawei, HiSilicon, 3GPP TSG-RAN WG4 Meeting #80, R4-166020, Gothenburg, Sweden, Aug. 22-26, 2016, 1-5.

* cited by examiner

CLUSTERED PERIODIC GAPS FOR MEASUREMENTS IN A HETEROGENEOUS NETWORK

TECHNICAL FIELD

The technology disclosed herein relates generally to wireless telecommunications networks, and more particularly relates to techniques for performing mobility measurements in such networks.

BACKGROUND

Heterogeneous Networks

In a typical cellular radio system, mobile terminals (also referred to as user equipment, UEs, wireless terminals, and/or mobile stations) communicate via a radio access network (RAN) with one or more core networks, which provide access to data networks, such as the Internet, and/or to the public-switched telecommunications network (PSTN). A RAN covers a geographical area that is divided into cell areas, with each cell area being served by a radio base station (also referred to as a base station, a RAN node, a "NodeB", and/or an enhanced NodeB or "eNodeB"). A cell area is a geographical area over which radio coverage is provided by the base station equipment at a base station site. The base stations communicate through radio communication channels with wireless terminals within range of the base stations.

Cellular communications system operators have begun offering mobile broadband data services based on, for example, WCDMA (Wideband Code-Division Multiple Access), HSPA (High-Speed Packet Access), and Long Term Evolution (LTE) wireless technologies. Fueled by the introduction of new devices designed for data applications, end user performance requirements continue to increase. The increased adoption of mobile broadband has resulted in significant growth in traffic handled by high-speed wireless data networks. Accordingly, techniques that allow cellular operators to manage networks more efficiently are desired.

Techniques to improve downlink performance may include Multiple-Input-Multiple-Output (MIMO) multi-antenna transmission techniques, multi-flow communication, multi-carrier deployment, etc. Since spectral efficiencies per link may be approaching theoretical limits, next steps may include improving spectral efficiencies per unit area. Further efficiencies for wireless networks may be achieved, for example, by changing a topology of traditional networks to provide increased uniformity of user experiences throughout a cell. Currently, so-called heterogeneous networks are being developed by members of the $3^{rd}$-Generation Partnership Project (3GPP), as discussed, for example, in: RP-121436, Study on UMTS Heterogeneous Networks, TSG RAN Meeting #57, Chicago, USA, 4-7 Sep. 2012; R1-124512, Initial considerations on Heterogeneous Networks for UMTS, Ericsson, ST-Ericsson, 3GOO TSG RAN WG1 Meeting #70bis, San Diego, Calif., USA, 8-12 Oct. 2012; and R1-124513, Heterogeneous Network Deployment Scenarios, Ericsson, ST-Ericsson, 3GPP TSG-RAN WG1 #70bis, San Diego, Calif., USA, 8-12 Oct. 2012.

A homogeneous network is a network of base stations (also referred to as NodeB's, enhanced NodeB's, or eNBs) in a planned layout, providing communications services for a collection of user terminals (also referred to as user equipment nodes, UEs, and/or wireless terminals), in which all base stations typically have similar transmit power levels, antenna patterns, receiver noise floors, and/or backhaul connectivity to the data network. Moreover, all base stations in a homogeneous network may generally offer unrestricted access to user terminals in the network, and each base station may serve roughly a same number of user terminals. Current cellular wireless communications systems in this category may include, for example, GSM (Global System for Mobile communication), WCDMA, HSDPA (High Speed Downlink Packet Access), LTE (Long Term Evolution), WiMAX (Worldwide Interoperability for Microwave Access), etc.

In a heterogeneous network, low power base stations (also referred to as low power nodes (LPNs), micro nodes, pico nodes, femto nodes, relay nodes, remote radio unit nodes, RRU nodes, small cells, RRUs, etc.) may be deployed along with or as an overlay to planned and/or regularly placed macro base stations. A macro base station (MBS) may thus provide service over a relatively large macro cell area, and each LPN may provide service for a respective relatively small LPN cell area within the relatively large macro cell area.

Power transmitted by an LPN may be relatively small, e.g., 2 Watts, compared to power transmitted by a macro base station, which may be 40 Watts for a typical macro base station. An LPN may be deployed, for example, to reduce/eliminate a coverage hole(s) in the coverage provided by the macro base stations, and/or to off-load traffic from macro base stations, such as to increase capacity in a high traffic location or so-called hot-spot. Due to its lower transmit power and smaller physical size, an LPN may offer greater flexibility for site acquisition.

Thus, a heterogeneous network features a multi-layered deployment of high-power nodes (HPNs), such as macro base stations, and low-power nodes (LPNs), such as so-called pico-base stations or pico-nodes. The LPNs and HPNs in a given region of a heterogeneous network may operate on the same frequency, in which case the deployment may be referred to as a co-channel heterogeneous deployment, or on different frequencies, in which case the deployment may be referred to as an inter-frequency or multi-carrier or multi-frequency heterogeneous deployment.

The maximum output power of a HPN can be, for example, between 43-49 dBm (20-80 Watts). An example of an HPN is a macro node (e.g., a wide-area base station). Examples of low power nodes include micro-nodes (e.g., medium-area base stations), pico-nodes (e.g., local-area base stations), femto-nodes (e.g., home base stations, or HBS), relay node, etc. The maximum output power of a low power node might be between 20 dBm and 38 dBm (100 mW-6.3 W), for example, depending upon the power class. For example a pico-node typically has a maximum output power of 24 dBm (250 mW), whereas an HBS might have a maximum output power of 20 dBm (100 mW).

Inter-Cell Interference Coordination

Inter-cell interference presents a big performance issue for cell edge users. In a heterogeneous network, the impact of inter-cell interference can be worse than is generally seen in homogeneous networks, due to large differences between the transmit power levels of macro base stations and LPNs. This is illustrated in FIG. 1, which illustrates a heterogeneous network deployment 100 in which two pico-nodes 130 have coverage areas that fall within the coverage area 120 of macro node 110. The cross-hatched regions 140 in FIG. 1 cover a region between an outer circle and an inner circle around each LPN. The inner circle represents an area where the received power from the LPN is higher than that from the macro base station. The outer circle represents an area where the path loss to the LPN base station is smaller than that to the macro base station.

The cross-hatched area 140 between the inner and outer circles is often referred to as the "imbalance zone." This imbalance zone 140 could potentially be an LPN range-expansion area because, from the uplink (terminal-to-base-station) perspective, the system would prefer that the terminal still be served by the LPN within this area. However, from the downlink (base-station-to-terminal) perspective, terminals at the outer edge of such an imbalance zone, such as terminal 150a in FIG. 1, experience a very large received-power difference between the macro and LPN layers. For example, if the transmit power levels are 40 watts and 1 watt for the macro node and LPN, respectively, this power difference can be as high as 16 dB. In contrast, terminals relatively far away from the pico-nodes 130, such as mobile terminal 150b, are not affected because the received powers from the LPNs are significantly less than that received from the macro base station 110.

As a result of these power differences, if a terminal in the range-expansion zone is served by a LPN cell and the macro cell is serving another terminal at the same time, using the same radio resources, then the terminal served by the LPN is subject to very severe interference from the macro base station.

Inter-cell interference coordination (ICIC) is supported in LTE networks, and is managed by signaling sent between eNodeB's via the eNodeB-to-eNodeB X2 interface. Each cell can signal to its neighboring cells, identifying high-power resource blocks in the frequency or time domains. This allows the neighboring cells to schedule cell-edge users in such a way as to avoid these high-power resource blocks. Such a mechanism can be used to reduce the impact of inter-cell interference.

To mitigate and handle interference in heterogeneous networks in LTE, a time-domain enhanced inter-cell interference coordination ICIC (eICIC) has been specified in release 10 for LTE. According to the time-domain eICIC scheme, a time-domain pattern of low-interference subframes, sometimes referred to as a "low-interference transmit pattern," is configured in the aggressor node, e.g., in an interfering macro eNB. More specifically, these patterns are called Almost Blank Subframe (ABS) patterns. An ABS pattern is configured in an aggressor cell to protect resources in subframes in the victim cell (e.g., a pico cell) that is subject to strong inter-cell interference from the aggressor node.

ABS subframes are typically configured with reduced transmit power, or no transmission power, and/or with reduced activity on some of the physical channels. In an ABS subframe, the basic common physical channels such as the cell-specific reference signal (CRS), primary/secondary synchronization signal (PSS/SSS), physical broadcast channel (PBCH), and the System Information Block 1 (SIB1) are transmitted to ensure seamless operation of "legacy UEs," i.e., those UEs that are compliant only with earlier releases of the 3GPP standards. The ABS pattern can also be categorized as non-MBSFN (non-Multicast-Broadcast Single Frequency Network) and MBSFN. In a non-MBSFN ABS pattern, an ABS can be configured in any subframes, whether those subframes are MBSFN-configurable or not. In an MBSFN ABS pattern, an ABS can be configured in only MBSFN-configurable subframes, i.e., subframes 1, 2, 3, 6, 7 and 8 in Frequency-Division Duplexing (FDD) mode, and subframes 3, 4, 7, 8 and 9 in Time-Division Duplexing (TDD) mode.

The serving eNB (e.g., a pico eNB) signals one or more measurement patterns, sometimes referred to as measurement resource restriction patterns, to inform the UE about the resources or subframes that the UE should use for performing measurements on a target victim cell (e.g., the serving pico cell and/or neighboring pico cells). The patterns can be different for serving cell measurements, neighbor cell measurements, etc. The resources or subframes on which the measurements are to be done by the UE overlap with ABS subframes in aggressor cell(s). Therefore, these resources or subframes within a measurement pattern are protected from aggressor cell interference, and can thus be referred to as protected subframes or even restricted subframes. The serving eNB ensures that each measurement pattern contains at least enough protected subframes in every radio frame to facilitate the UE's regular measurement of protected subframes, e.g., one or two protected subframes per frame. Otherwise the UE cannot meet the pre-defined measurement requirements when configured with measurement patterns related to operation in the heterogeneous network.

Machine-Type Communication

So-called machine-to-machine (M2M) communication, often referred to in 3GPP documentation as machine-type communication (MTC), is used to establish communication between machines and between machines and humans. The communication may comprise an exchange of application-specific data such as measurement data, as well as an exchange of control signaling, configuration information, etc. An M2M device's size may vary from that of a wallet-sized device to that of a base station.

M2M devices are quite often used for applications like sensing environmental conditions (e.g., temperature reading), metering or measurement (e.g., electricity usage, etc.), fault finding, or error detection, etc. In many of these applications the M2M devices are active only occasionally, but for durations and rates that depend upon the type of service, e.g., about 200 milliseconds once every 2 seconds, about 500 milliseconds every 60 minutes, etc. Note that a M2M device may also do radio measurement on other frequencies or radio-access technologies (RATs).

UE Measurements

In order to support different functions such as mobility, which in turn includes the functions of cell selection, cell reselection, handover, RRC re-establishment, connection release with redirection, etc., as well as to support other functions such as minimization of drive tests, self-organizing network (SON), positioning, etc., the UE is required to perform one or more radio measurements (e.g., timing measurements, signal strength measurements or other signal quality measurements) on signals transmitted by neighboring cells, i.e., by cells other than the cell serving the UE. Prior to performing such measurements the UE generally has to identify the cell from which a signal is sent, and determine the cell's physical cell identity (PCI). Therefore PCI determination can also be considered a type of a measurement.

The UE receives measurement configuration or assistance data/information, which is a message or an information element (IE) sent by the network node (e.g., a serving eNode B, positioning node, etc.) to configure the UE to perform the requested measurements. For example, the measurement configuration may contain information related to the carrier frequency to be measured, a radio-access technology (RAT) or RATs to be measured, a type of measurement (e.g., Reference Signal Received Power, or RSRP), whether higher-layer time-domain filtering should be performed, measurement bandwidth related parameters, etc.

The measurements are done by the UE on the serving cell as well as on neighbor cells, over some known reference symbols or pilot sequences. The measurements are done on cells on an intra-frequency carrier, inter-frequency carrier(s) as well as on inter-RAT carriers(s) (depending upon the UE's capability for supporting a particular RAT or RATs).

To enable inter-frequency and inter-RAT measurements that require gaps (i.e., intervals in which the mobile terminal receiver may re-tune to another frequency and/or configure itself for a different RAT), the network has to configure measurement gaps for the UE. Two periodic measurement gap patterns, both with a measurement gap length of 6 milliseconds, are defined for LTE:

Measurement gap pattern #0 with repetition period 40 milliseconds; and

Measurement gap pattern #1 with repetition period 80 milliseconds.

In High-Speed Packet Access (HSPA) networks, the inter-frequency and inter-RAT measurements are performed in compressed mode gaps, which are also a type of network-configured measurement gap.

Some measurements may also require a UE to measure the signals transmitted by the UE in the uplink. The measurements are done by the UE in RRC connected state or in CELL_DCH state (in HSPA) as well as in low activity RRC states (e.g., idle state, CELL_FACH state in HSPA, URA_PCH and CELL_PCH states in HSPA, etc.). In a multi-carrier or carrier aggregation (CA) scenario, the UE may perform the measurements on the cells on the primary component carrier (PCC) as well as on the cells on one or more secondary component carriers (SCCs).

These measurements are done for various purposes. Some example measurement purposes are: mobility, positioning, self-organizing network (SON), minimization of drive tests (MDT), operation and maintenance (O&M), network planning and optimization, etc. The measurements are typically performed over time durations on the order of a few hundreds of milliseconds to a few seconds. The same measurements are generally applicable to both single-carrier and carrier aggregation scenarios. However in carrier aggregation scenarios the specific measurement requirements may be different. For example, the measurement period may be different in carrier aggregation scenarios; i.e., it can be either relaxed or more stringent depending upon whether a secondary component carrier (SCC) is activated or not. This may also depend upon the UE's capability, i.e. whether a carrier aggregation-capable UE is able to perform measurements on an SCC with or without gaps.

Examples of mobility measurements in LTE include:
Reference symbol received power (RSRP); and
Reference symbol received quality (RSRQ).

Examples of mobility measurements in HSPA are:
Common pilot channel received signal code power (CPICH RSCP); and
CPICH Ec/No.

An example of mobility measurements in GSM/GERAN is:
GSM carrier RSSI.

Examples of mobility measurements in CDMA2000 systems are:
Pilot strength for CDMA2000 1xRTT; and
Pilot strength for HRPD.

Mobility measurements may also include the step of identifying or detecting a cell, which may belong to LTE, HSPA, CDMA2000, GSM, etc. Cell detection comprises identifying at least the physical cell identity (PCI) and subsequently performing the signal measurement (e.g., RSRP) of the identified cell. The UE may also have to acquire the cell global ID (CGI) of a UE. In HSPA and LTE the serving cell can request the UE to acquire the system information (SI) of the target cell. More specifically, the SI is read by the UE to acquire the cell global identifier (CGI), which uniquely identifies a cell of the target cell. The UE may also be requested to acquire other information such as CSG indicator, CSG proximity detection, etc., from the target cell.

Examples of positioning measurements in LTE are:
Reference signal time difference (RSTD); and
UE RX-TX time difference measurement.

The UE RX-TX time difference measurement requires the UE to perform measurement on the downlink reference signal as well as on the uplink transmitted signals.

Examples of other measurements which may be used for radio link maintenance, MDT, SON or for other purposes are:

Control channel failure rate or quality estimate e.g.,
Paging channel failure rate, and
Broadcast channel failure rate;
Physical layer problem detection e.g.,
Out of synchronization (out of sync) detection,
In synchronization (in-sync) detection,
Radio link monitoring, and
Radio link failure determination or monitoring.

Still other measurements performed by the UE include channel-state-information (CSI) measurements, which are used for scheduling, link adaptation, etc. by the network. Examples of CSI measurements are CQI, PMI, RI, etc.

Radio measurements performed by the UE are used by the UE for one or more radio operational tasks. Examples of such tasks are reporting the measurements to the network, which in turn may use them for various tasks. For example, in RRC connected state the UE reports radio measurements to the serving node. In response to the reported UE measurements, the serving network node takes certain decisions, e.g., it may send a mobility command to the UE for the purpose of cell change. Examples of cell change are handover, RRC connection re-establishment, RRC connection release with redirection, primary cell (PCell) change in CA, Primary Component Carrier (PCC) change in PCC, etc. An example of cell change in idle or low activity state is cell reselection. In another example, the UE may itself use the radio measurements for performing tasks e.g., cell selection, cell reselection, etc.

UE Measurements for Offloading Purposes

Recently, the RAN2 working group of 3GPP has discussed UE measurements (cell detection and cell measurements) to be used for offloading purposes in multi-frequency heterogeneous network deployments in which macro cells on one carrier frequency perform mobility-related functions while pico cells on a second carrier frequency provide additional capacity in hotspots. (See, e.g., 3GPP RAN WG2, "LS on relaxed performance requirements", R2-132239.)

While mobility measurements are primarily carried out when the serving cell's signal is getting weak, measurements for offloading purposes may be carried out even when the serving cell is strong, e.g., when the UE is connected to a macro cell. This approach provides desirable benefits on a system level as well as for the individual users. Offloading UEs from the macro cell to pico cells may allow increased throughput both for the remaining UEs in the macro cell and for the UEs that are handed over to the inter-frequency neighbor pico cell.

Gain Control

When a UE tunes in to an inter-frequency carrier, it typically has to estimate the signal strength in order to set a gain that allows the received signals to be quantized to a limited number of bits without loss of significant information. The time required to perform this signal strength estimation, when coupled with radio switching times, reduces the time in the measurement gap that can be used for cell search and RSRP/RSRQ measurements.

If there is a large difference between the assumed signal strength (e.g., the signal strength observed the last time the carrier was visited) and the actual signal strength, the gain correction will generally require a larger portion of the measurement gap than if the difference is small. For E-UTRA (LTE networks), this may result in that less than the 5.1 milliseconds that are required in order to detect cells with arbitrary frame timing is available in the measurement gap. Hence cells with particular frame timings will be impossible to detect with conventional E-UTRAN cell search approaches. This problem may also lead to reduced RSRP/RSRQ measurement accuracy since fewer reference symbols may be within reach. Both issues may impact the mobility function negatively.

Possible approaches to mitigating this problem include representing received samples with significantly more bits, such that information loss is prevented even in case of inaccurate gain settings, and increasing the dynamic range of the analog receiver parts. However, this approach results in that more memory is needed for radio samples, leading to increased cost and power consumption for the receiver. Another approach is to schedule periodic measurement gaps that are relatively close to one another. However, this approach results in more frequent interruptions in an active data connection than are desired, or in more frequent and/or more extensive wake-up intervals for a mobile terminal that is in an idle state. Accordingly, improved techniques for handling offloading measurements in a heterogeneous network deployment are needed.

SUMMARY

According to several embodiments of the presently disclosed techniques, a new kind of measurement gap pattern is introduced for the purpose of offloading measurements. This measurement gap pattern has a series of measurement gap bursts, such that the measurement gap bursts are separated by a repetition period and each measurement gap burst comprises two or more measurement gaps. In some embodiments, the repetition period is chosen so that it aligns well with short-DRX cycles and/or long-DRX cycles. For instance, the measurement gap pattern repetition period and the long-DRX cycle length in some embodiments are related to each other by an integer power of N, e.g., N=2 or N=4.

Embodiments of the disclosed techniques include, for example, a method, in a network node of a wireless communication network, for configuring measurements in a mobile terminal. This example method includes selecting a measurement gap pattern to be used by the mobile terminal, the measurement gap pattern having a series of measurement gap bursts such that the measurement gap bursts are separated by a repetition period and each measurement gap burst comprises two or more measurement gaps, and signaling the measurement gap pattern to the mobile terminal.

In some embodiments, selecting the measurement gap pattern comprises selecting the repetition period or selecting a number of measurement gaps for each measurement gap burst, or both. This may be based, for example, on a cell capacity limit for a serving cell for the mobile terminal, and/or on one or more of: a number of carrier frequencies on which the mobile terminal has to perform measurements; a type of measurement; a frequency of gaps in a burst; a type of DRX cycle; a length of DRX cycle; and radio channel conditions.

In some embodiments, the repetition period may be selected such that the selected repetition period is an integer multiple of a long-DRX cycle length for the mobile terminal. In some of these embodiments, the repetition period may be selected such that a ratio of the selected repetition period to a long-DRX cycle length for the mobile terminal is an integer power of 2.

In some embodiments, the method further includes selecting a measurement gap pattern offset for the measurement gap pattern and signaling the measurement gap pattern offset to the mobile terminal, where selecting the measurement gap pattern offset comprises choosing the measurement gap pattern offset so that an initial measurement gap in a measurement gap burst is adjacent to or overlapping with an On-duration interval of a long-DRX cycle for the mobile terminal.

In some embodiments, signaling the measurement gap pattern to the mobile terminal comprises sending the mobile terminal an identifier corresponding to one of two or more predefined measurement patterns known to the mobile terminal. In other embodiments, the mobile terminal is sent an indicator of one or more of the following: a number of gaps in a burst; a distance in time between measurement gaps in a burst; a repetition period between bursts; and a measurement gap offset.

In some embodiments, the method further includes receiving an indication from the mobile terminal, the indication from the mobile terminal indicating a recommended or required value for one or more of a number of gaps in a burst, a distance in time between measurement gaps in a burst, a repetition period between bursts, and a measurement gap offset. In these embodiments, selecting the measurement gap pattern may be based on the indication received from the mobile terminal.

In some of these and in some other embodiments, the example method summarized above may further comprise receiving a capability indication from the mobile terminal, the capability indication indicating that the mobile terminal is at least capable of performing one or more measurements using the measurement gap pattern having a series of measurement gap bursts such that the measurement gap bursts are separated by a repetition period and each measurement gap burst comprises two or more measurement gaps. In these embodiments, the selecting of the measurement gap pattern and the signaling of the measurement gap pattern to the mobile terminal are in response to receiving the capability indication.

A related example embodiment according to the techniques disclosed herein is suitable for implementation in a mobile terminal operating in a wireless communication network and served by a first cell operating on a first carrier frequency. The method includes receiving signaling indicating a measurement gap pattern to be used by the mobile terminal, the measurement gap pattern having a series of measurement gap bursts such that the measurement gap bursts are separated by a repetition period and each measurement gap burst comprises two or more measurement gaps. The method further includes performing one or more measurements on at least one cell on a second carrier frequency according to the signaled measurement gap pattern. In some embodiments, the measurements performed on at least one cell operating on the second carrier frequency are offloading measurements, and the offloading measurements are performed by the UE regardless of the signal quality of measurements performed by the UE on the first cell.

In some embodiments, the signaled measurement gap pattern has a repetition period that is an integer multiple of a long-DRX cycle length for the mobile terminal. In some of these embodiments, a ratio of the repetition period to a long-DRX cycle length for the mobile terminal is an integer power of 2.

In some embodiments, the mobile terminal receives signaling indicating the measurement gap pattern by receiving an identifier corresponding to one of two or more predefined measurement patterns known to the mobile terminal. In other embodiments, the mobile terminal receives an indicator of one or more of the following: a number of gaps in a burst; a distance in time between measurement gaps in a burst; a repetition period between bursts; and a measurement gap offset.

In some embodiments, the mobile terminal first sends an indication to a network node in the wireless communication network, the indication indicating a recommended or required value for one or more of a number of gaps in a burst, a distance in time between measurement gaps in a burst, a repetition period between bursts, and a measurement gap offset. In some of these and in some other embodiments, the mobile terminal sends a capability indication to a network node in the wireless communication network, the capability indication indicating that the mobile terminal is at least capable of performing one or more measurements using the measurement gap pattern having a series of measurement gap bursts such that the measurement gap bursts are separated by a repetition period and each measurement gap burst comprises two or more measurement gaps.

Other embodiments of the technology disclosed herein include network node apparatus and mobile terminal apparatus, each configured to carry out one of the example methods summarized above or variants thereof. One such network node apparatus, for example, includes a communications interface circuit configured to communicate with a mobile terminal or to communicate with one or more other network nodes, or configured to communicate with the mobile terminal and one or more other network nodes, and further includes a processing circuit, where the processing circuit is configured, e.g., with appropriate software, to select an measurement gap pattern to be used by the mobile terminal, the measurement gap pattern having a series of measurement gap bursts such that the measurement gap bursts are separated by a repetition period and each measurement gap burst comprises two or more measurement gaps. The processing circuit is further configured to signal the measurement gap pattern to the mobile terminal, using the communications interface circuit, either directly or via one or more other network nodes.

Likewise, an example mobile terminal according to some of the embodiments described herein is configured for operation in a wireless communication network and includes a radio transceiver circuit configured to communicate with a radio network node in the wireless communication network. The mobile terminal further includes a processing circuit that is configured to receive signaling indicating an measurement gap pattern to be used by the mobile terminal, the measurement gap pattern having a series of measurement gap bursts such that the measurement gap bursts are separated by a repetition period and each measurement gap burst comprises two or more measurement gaps, and to perform measurements according to the signaled measurement gap pattern.

DETAILED DESCRIPTION

Figure 1:
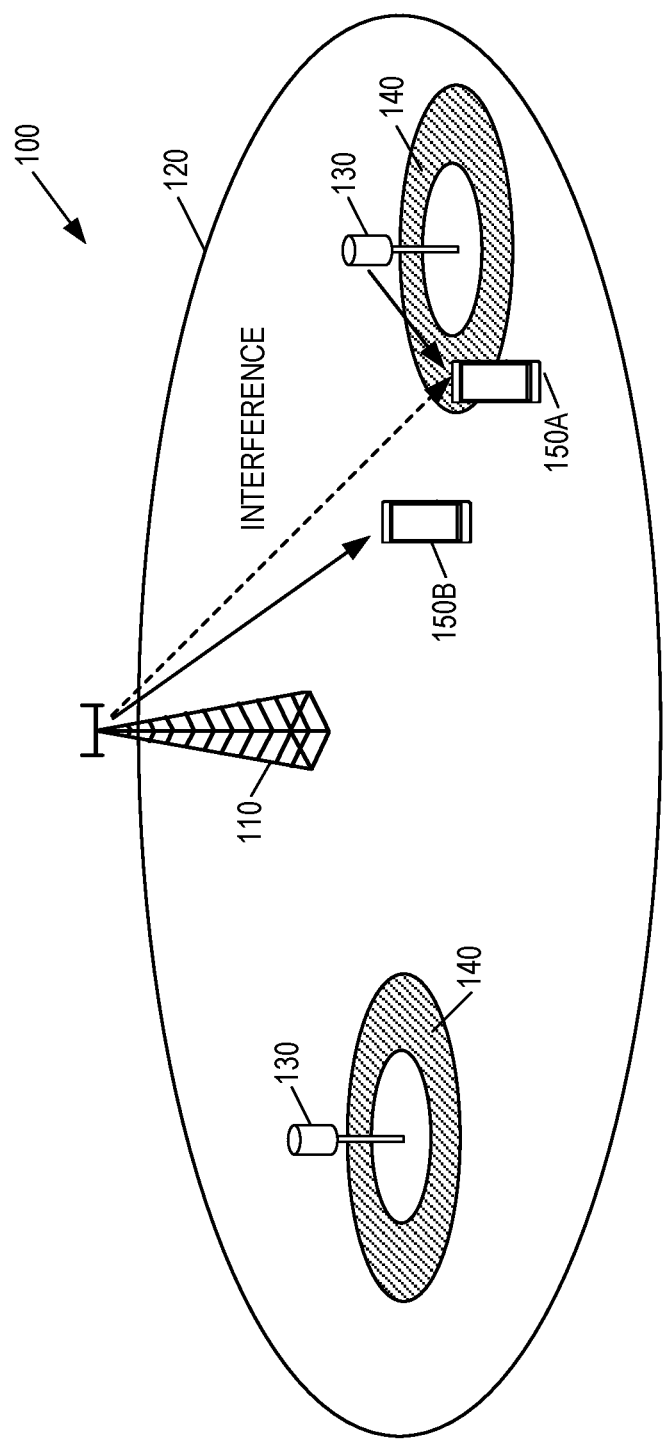
FIG. 1 is a schematic diagram illustrating a portion of an example network in which the techniques described herein may be implemented.

Inventive concepts will now be described more fully hereinafter with reference to the accompanying drawings, in which examples of embodiments of inventive concepts are shown. These inventive concepts may, however, be embodied in many different forms and should not be construed as limited to the embodiments set forth herein. Rather, these embodiments are provided so that this disclosure will be thorough and complete, and fully convey the scope of present inventive concepts to those skilled in the art. It should also be noted that these embodiments are not mutually exclusive. Components from one embodiment may be tacitly assumed to be present or used in another embodiment.

For purposes of illustration and explanation only, these and other embodiments of present inventive concepts are described herein in the context of operating in a Radio Access Network (RAN) that communicates over radio communication channels with mobile terminals (also referred to as wireless terminals or UEs). As used herein, a mobile terminal, wireless terminal, or UE can include any device that receives data from a communication network, and may include, but is not limited to, a mobile telephone ("cellular" telephone), laptop/portable computer, pocket computer, hand-held computer, desktop computer, a machine to machine (M2M) or MTC type device, a sensor with a wireless communication interface, etc.

In some embodiments of a RAN, several base stations may be connected (e.g., by landlines or radio channels) to a radio network controller (RNC). A radio network controller, also sometimes termed a base station controller (BSC), may supervise and coordinate various activities of the plural base stations connected thereto. A radio network controller may be connected to one or more core networks. According to some other embodiments of a RAN, base stations may be connected to one or more core networks without a separate RNC(s) between, for example, with functionality of an RNC implemented at base stations and/or core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) technology. UTRAN, short for UMTS Terrestrial Radio Access Network, is a collective term for the Node B's and Radio Network Controllers that make up the UMTS radio access network. Thus, UTRAN is essentially a radio access network using wideband code division multiple access (WCDMA) for UEs.

The Third Generation Partnership Project (3GPP) has undertaken to further evolve the UTRAN and GSM based radio access network technologies. In this regard, specifications for the Evolved Universal Terrestrial Radio Access Network (E-UTRAN) are ongoing within 3GPP. The Evolved Universal Terrestrial Radio Access Network (E-UTRAN) comprises the Long Term Evolution (LTE) and System Architecture Evolution (SAE).

Note that although terminology from LTE and or UMTS is used in this disclosure to exemplify embodiments of the inventive concepts, this should not be seen as limiting the scope of inventive concepts to only these systems. Other wireless systems, including variations and successors of 3GPP LTE and WCDMA systems, WiMAX (Worldwide Interoperability for Microwave Access), UMB (Ultra Mobile Broadband), HSDPA (High-Speed Downlink Packet Access), GSM (Global System for Mobile Communications), etc., may also benefit from exploiting embodiments of present inventive concepts disclosed herein.

Also note that terminology such as base station (also referred to as NodeB, eNodeB, or Evolved Node B) and wireless terminal or mobile terminal (also referred to as User Equipment node or UE) should be considering non-limiting and does not imply a certain hierarchical relation between the two. In general, a base station (e.g., a "NodeB" or "eNodeB") and a wireless terminal (e.g., a "UE") may be considered as examples of respective different communications devices that communicate with each other over a wireless radio channel.

While embodiments discussed herein may focus on wireless transmissions in a downlink from a NodeB to a UE, embodiments of inventive concepts may also be applied, for example, in an uplink. Furthermore, although the description below focuses, for purposes of illustration, on example embodiments in which described solutions are applied in heterogeneous networks that include a mix of relatively higher-power base stations (e.g., "macro" base stations, which may also be referred to as wide-area base stations or wide-area network nodes) and relatively lower-power nodes (e.g., "pico" base stations, which may also be referred to as local-area base stations or local-area network nodes), the described techniques may be applied in any suitable type of network, including both homogeneous and heterogeneous configurations. Thus, the base stations involved in the described configurations may be similar or identical to one another, or may differ in terms of transmission power, number of transmitter-receiver antennas, processing power, receiver and transmitter characteristics, and/or any other functional or physical capability.

With the proliferation of user friendly smart phones and tablets, the usage of high data rate services such as video streaming over the mobile network is becoming commonplace, greatly increasing the amount of traffic in mobile networks. Thus, there is a great urgency in the mobile network community to ensure that the capacity of mobile networks keeps up increasing with this ever-increasing user demand. The latest systems such as Long Term Evolution (LTE), especially when coupled with interference mitigation techniques, have spectral efficiencies very close to theoretical Shannon limit. The continuous upgrading of current networks to support the latest technologies and densifying the number of base stations per unit area are two of the most widely used approaches to meet the increasing traffic demands.

One upgrade approach that is gaining high attention involves the deployment of so-called heterogeneous networks, where the traditional pre-planned macro base stations (known as the macro layer) are complemented with several low-powered base stations that may in some cases be deployed in an ad hoc manner. The 3rd Generation Partnership Project (3GPP) has incorporated the concept of Heterogeneous Networks as one of the core items of study in the latest enhancements of LTE, such as LTE release 11, and several low-powered base stations to realize heterogeneous networks such as pico base stations, femto base stations (also known as home base stations or HeNBs), relays, and RRHs (remote radio heads) have been defined. Similar concepts are being applied to upgrade UMTS networks, as well.

Figure 2:
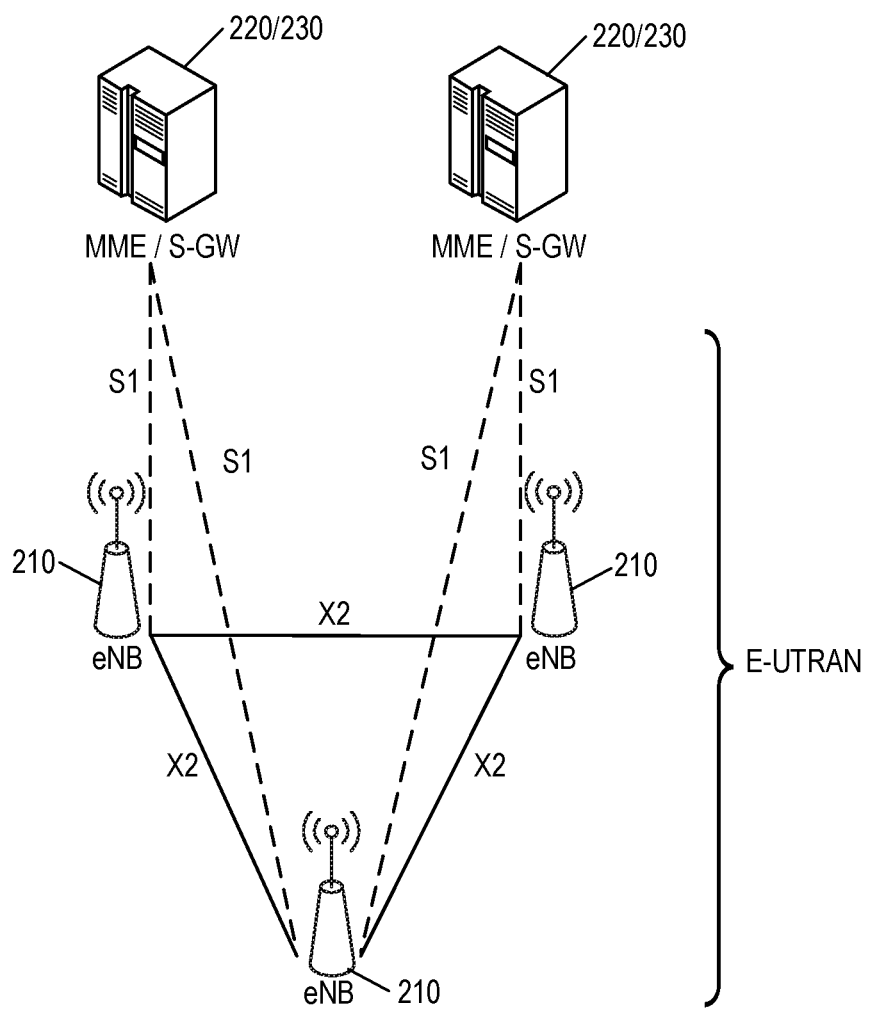
FIG. 2 illustrates components of the E-UTRAN system architecture.

The Evolved UMTS Terrestrial Radio Access Network (E-UTRAN) includes base stations called enhanced NodeBs (eNBs or eNodeBs), providing the E-UTRA user plane and control plane protocol terminations towards the UE. The eNBs are interconnected with each other using the X2 interface. The eNBs are also connected using the S1 interface to the EPC (Evolved Packet Core), more specifically to the MME (Mobility Management Entity) by means of the S1-MME interface and to the Serving Gateway (S-GW) by means of the S1-U interface. The S1 interface supports many-to-many relation between MMEs/S-GWs and eNBs. A simplified view of the E-UTRAN architecture is illustrated in FIG. 2.

The eNB 210 hosts functionalities such as Radio Resource Management (RRM), radio bearer control, admission control, header compression of user plane data towards serving gateway, and/or routing of user plane data towards the serving gateway. The MME 220 is the control node that processes the signaling between the UE and the CN (core network). Significant functions of the MME 220 are related to connection management and bearer management, which are handled via Non Access Stratum (NAS) protocols. The S-GW 230 is the anchor point for UE mobility, and also includes other functionalities such as temporary DL (down link) data buffering while the UE is being paged, packet routing and forwarding to the right eNB, and/or gathering of information for charging and lawful interception. The PDN Gateway (P-GW, not shown in FIG. 2) is the node responsible for UE IP address allocation, as well as Quality of Service (QoS) enforcement (as further discussed below). The reader is referred to 3GPP TS 36.300 and the references therein for further details of functionalities of the different nodes.

In describing various embodiments of the presently disclosed techniques, the non-limiting term radio network node may be used to refer any type of network node serving UE and/or connected to other network node or network element or any radio node from where UE receives signal. Examples of radio network nodes are Node B's, base stations (BS), multi-standard radio (MSR) radio nodes such as MSR BS's, eNodeB's, network controllers, radio network controllers (RNCs), base station controllers, relays, donor nodes controlling relays, base transceiver stations (BTS), access points (AP), wireless routers, transmission points, transmission nodes, remote radio units (RRUs), remote radio heads (RRHs), nodes in a distributed antenna system (DAS), etc.

In some cases a more general term "network node" is used; this term may correspond to any type of radio network node or any network node that communicates with at least a radio network node. Examples of network nodes are any radio network node stated above, core network nodes (e.g., MSC, MME, etc.), O&M, OSS, SON, positioning nodes (e.g., E-SMLC), MDT, etc.

In describing some embodiments, the term user equipment (UE) is used, and refers to any type of wireless device communicating with a radio network node in a cellular or mobile communication system. Examples of UEs are target devices, device-to-device UEs, machine-type UEs or UEs capable of machine-to-machine communication, PDAs, wireless-enabled table computers, mobile terminals, smart phones, laptop embedded equipped (LEE), laptop mounted equipment (LME), USB dongles, customer premises equipment (CPE), etc. The term "mobile terminal" as used herein should be understood as being generally interchangeable with the term UE as used herein and in the various specifications promulgated by the 3GPP, but should not be understood as being limited to devices compliant to 3GPP standards.

Various embodiments of the presently disclosed techniques are described for inter-frequency measurements performed by the UE. However the embodiments are applicable to any kind of measurement that requires measurement gaps, e.g., inter-frequency measurements, inter-RAT measurements, which in turn may belong to any RAT such as GSM/GERAN, UTRA FDD, UTRA TDD, CDMA2000, HRPD, WLAN, WiFi, etc. As an example, a UE served by a UTRA cell may be configured by its serving network node to perform inter-RAT measurements (e.g., RSRP, RSRQ, etc.) during measurement gaps on one or more cells belonging to one or more E-UTRAN carrier frequencies.

As noted above, 3GPP has discussed UE measurements to be used for offloading purposes in multi-frequency heterogeneous network deployments in which macro cells on one carrier frequency perform mobility-related functions while pico cells on a second carrier frequency provide additional capacity in hotspots. These measurements may be similar to mobility measurements, which are primarily carried out when the serving cell's signal is getting weak, but may be carried out even when the serving cell is strong, e.g., when the UE is connected to a macro cell.

One concern with the routine performing of offload measurements by UEs is that performing these measurements according to existing Release 11 measurement requirements (see 3GPP TS 36.133) when the serving cell is strong would result in increased power consumption, e.g., due to measurements being carried out when the UE otherwise could be inactive when configured for discontinuous receive (DRX) operation. Moreover, since connected mode (RRC_CONNECTED) inter-frequency measurements are carried out in measurement gaps, the scheduling opportunities for the UE on both downlink and uplink would be reduced, even while the UE may experience a very high radio channel quality and may also be involved in communication at high bit rates. Moreover, an additional concern is that if offloading measurements were to be activated and deactivated frequently—to avoid too big an impact on the UE power consumption—the offloading measurements would instead have a negative impact on the system throughput due to signaling overhead.

It has been proposed to relax the requirements on UE measurements so that the UE can carry out those relatively infrequently, compared to existing Release 11 requirements. One alternative involves carrying out measurements according to such relaxed requirements, e.g., using existing measurement gap patterns (6 milliseconds gap, every 40 or 80 milliseconds, but where the UE can skip measurements in the majority of the gaps. Another alternative is to carry out the measurements in a new pattern, with, for example, a 6-millisecond gap every 3 seconds. Still another alternative is to have the UE schedule offloading measurements autonomously during inactive time, when configured with DRX.

There are several problems associated with having an LTE UE schedule offloading measurements autonomously during inactive time. To start with, the UE is not required to refrain from monitoring the Physical Downlink Control Channel (PDCCH) during inactivity. Rather, the UE is simply allowed to not monitor PDCCH. Moreover retransmission in either direction due to hybrid automatic-repeat-request (HARQ) operation may extend the active time to an extent not possible to predict beforehand.

It should also be noted that for the ANR (Automatic Neighbor Relations) functionality, the eNB can avoid scheduling the UE in subsequent DRX cycle(s) after having requested the UE to read CGI (Global Cell Identity), leading to a predictable UE behavior. Furthermore, for a UE that is close to being continuously scheduled by the eNB, either due to the needed throughput or due to the nature of the used services, there may not be any inactivity time. Hence a UE that would be the most interesting to hand over to an inter-frequency pico-cell neighbor might not have any time available for carrying out the required offloading measurements autonomously.

The option of configuring UEs with measurement gaps for the offloading measurements allows a predictable UE behavior. However, if the dense legacy measurement gap patterns are used, with 6-milliseconds gaps every 40 or 80 milliseconds, the subframes in which it is possible to schedule the UE will be reduced on the downlink by 15% and 7.5%, respectively, for 40- and 80-millisecond gap periodicities. Corresponding figures for the uplink are 17.5% and 8.75%. At the same time, with relaxed requirements it may be sufficient to perform measurements in every tenth gap or so, on average. Thus, such approach would introduce unnecessary restrictions on the scheduling of the UE.

A sparse pattern of, for example, a single 6-millisecond measurement gap every second or more, is not feasible from the UE point of view, since such a distance between the inter-frequency measurements would render the gain state (AGC) outdated from one measurement to the next. As a result, part of the measurement gap that otherwise would be used for reference signal received power (RSRP) and reference signal received quality (RSRQ) measurements would have to be used for gain search instead. Accordingly, there may not be enough remaining Orthogonal Frequency-Division Multiplexing (OFDM) symbols carrying common reference symbols (CRS) to permit successful RSRP and RSRQ measurements of known cells. This may particularly be an issue for Time-Division Duplexing (TDD) operation in LTE, since there may be as few as one downlink subframe per five-millisecond interval. Further, there may not be enough radio time for searching for new cells, which is particularly an issue for asynchronous Frequency-Division Duplexing (FDD) deployments in LTE networks, where about 5.1 milliseconds radio time is needed to find cells with arbitrary timing.

According to several embodiments of the presently disclosed techniques, a new kind of measurement gap pattern with bursts of gaps is introduced for the purpose of offloading measurements. The measurement pattern repetition period is chosen so that it aligns well with long-DRX and short-DRX cycles; e.g., the measurement gap pattern repetition period and the long-DRX cycle length are related to each other by an integer power of N, e.g., N=2.

When a network node (e.g., eNB) configures the UE with the measurement gap pattern offset (the grid of subframes where the measurement gap pattern will start), it takes the long-DRX offset (the grid of subframes where the long-DRX cycles will start) into account, such that the beginning of the measurement gap burst is overlapping or adjacent to the ON-duration of the long-DRX cycle.

According to some embodiments of the techniques detailed below, the UE signals its capability to the network node, indicating that it can use burst gap measurement pattern for measuring on non-serving carrier frequency.

Advantages of using a sparse pattern with bursts of gaps, as detailed herein, may include one or more of the following, in some of the embodiments detailed herein:

More subframes will be available for scheduling (DL and UL) than if the dense legacy measurement gap patterns are used.

Automatic Gain Control (AGC) overhead will be smaller (i.e., gain settings can, on average, be adjusted more quickly) than if a new sparse pattern with single gaps is used. This improves cell detection and RSRP and RSRQ measurement accuracy, hence event detection.

By aligning the start of the sparse measurement gap pattern to the start of the long-DRX cycle, power can be saved, since the UE does not have to wake up again at times that are potentially far away from the ON-duration to do measurements in the event that it is not scheduled by the eNB. Choosing the length of the measurement gap pattern such that it is an integer power of 2 (positive or negative) of the long-DRX cycle length also allows the start of the sparse measurement gap pattern to align with short-DRX cycles, should such have been configured.

Thus, a new kind of gap pattern is defined where measurement gaps are provided in sparse bursts. The repetition period for the gap pattern is chosen so that the ratio between the repetition period and the long-DRX cycle length corresponds to an integer power of N, e.g., N=2. It shall be noted that there are two different bases used for long-DRX cycles: those that start with 10 milliseconds (10, 20, 40, 80, 160, 320, 640, 1280, 2560 milliseconds) and those starting with 32 milliseconds (32, 64, 128, 256, 512, 1024, 2048 milliseconds). (See 3GPP TS 36.331.)

The distance between the measurement gaps in the burst may be the same as for legacy measurement gap patterns, e.g., 40 milliseconds. The number of gaps provided in a burst may be limited, e.g., to 2 or 3, to reduce the AGC overhead. With 40 milliseconds distance between gaps in a burst, for example, the gain state from the previous gap can be used as starting point in the following measurement gap, and a gain search can be avoided.

The number of gaps in a burst (a cluster of gaps) may also depend upon additional measurement related parameters. Examples are number of carriers on whose cells UE has to do measurement in parallel i.e. over the same measurement time, type of measurements (e.g., inter-frequency, inter-RAT, etc.), frequency of gap in a burst (e.g., every 40 milliseconds or 80 ms), type of DRX cycle, length of DRX cycle, etc.

The periodicity of the measurement gap pattern may be, for example, 320 ms, thus limiting the offloading measurements for a fully active UE to 2-3 measurement gaps of 6-milliseconds each per 320 millisecond interval.

The measurement gap pattern offset may be chosen such that the beginning of the burst overlaps or is adjacent to the ON-duration, thus limiting the time the UE has to be active in the event that it is not scheduled by the network. It should be noted that according to 3GPP TS 36.331, "Radio Resource Control," section 6.3.2, if a short-DRX cycle is configured then the long-DRX cycle shall be a multiple thereof. Moreover, from 3GPP TS 36.321, "Discontinuous Reception (DRX), section 5.7, it follows that the start of a long-DRX cycle coincides with the start of a short-DRX cycle.

In some embodiments, the measurement requirements can be based on an assumption that if there is a burst in the current DRX cycle, in the event that the UE is inactive except for in the ON-duration, then the UE is using at least one gap for the measurement per gap repetition period. In the event that the UE is fully active, it is assumed that the UE is using more than one gap per gap repetition period, e.g., all of the provided measurement gaps.

The starting of burst of gaps, measurement gap pattern offset or any other timing related information is derived from a particular reference time. The reference time can be, for example, the timing of a particular cell, e.g., the timing of serving cell. For example, the reference time can be based on a system frame number (SFN) of a certain cell. The particular SFN value can be configured or it can be pre-defined e.g., SFN=0 of serving cell.

Figure 3:
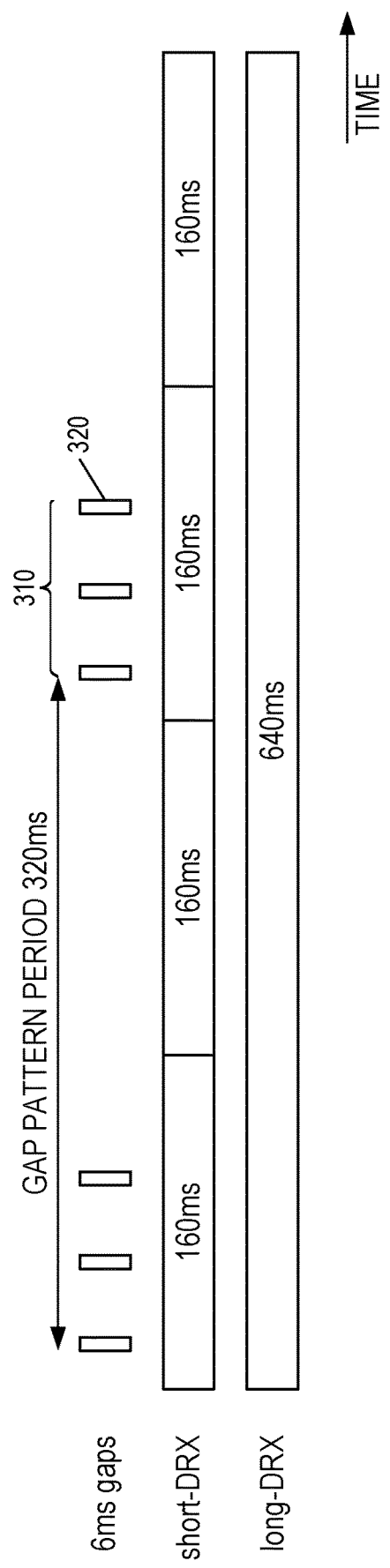
FIG. 3 shows an example measurement gap burst pattern according to one or more of the presently disclosed techniques.

An example measurement gap pattern is illustrated in FIG. 3, which shows two measurement gap bursts 310, each including three measurement gaps 320. In this example, the measurement gaps 320 are 6-millisecond gaps, spaced at 40 milliseconds from one another, i.e., the starting times of successive gaps are separated by 40 milliseconds. The repetition period between measurement gap bursts 310 is 320 milliseconds. This repetition period allows the measurement gap pattern to be aligned with underlying short-DRX and long-DRX cycles, as shown in the figure. More specifically, the measurement gap pattern can be aligned so that each burst pattern begins at or near the beginning of a short-DRX cycle. Even more specifically, the measurement gap pattern can be aligned so that the initial measurement gap in each measurement burst is adjacent to or overlapping with an on-duration interval of a DRX cycle for the mobile terminal. This alignment can be signaled to the mobile terminal by selecting an appropriate measurement gap pattern offset and sending the measurement gap pattern offset to the mobile terminal.

Several variants of the techniques described generally above are described in more detail below. For convenience, the discussion is divided into several sections, each titled "Embodiment 1," "Embodiment 2," etc. It will be appreciated, however, that features from different embodiments may be combined with one another, unless the context clearly indicates otherwise. It should further be appreciated that other variations of these example embodiments are possible.

Embodiment 1

Fixed Gap Patterns

Embodiment 1 concerns adding one or more new measurement patterns having a fixed number of measurement gaps in each measurement gap burst and a fixed repetition period of the measurement gap bursts. With this approach, the new pattern or patterns are known beforehand by the UE, e.g., because the patterns are pre-defined in a standard. The type of measurements for which these patterns are used can also be pre-defined.

In some embodiments according to this approach, at least one pattern may have a repetition period that fits the DRX cycles that are based on 10 ms, and at least one other pattern may have a repetition period that fits DRX cycles that are based on 32 milliseconds (see "General Description" above).

A particular UE of interest may have been configured with long-DRX and potentially short-DRX cycles. The offset of the long-DRX cycle to some system radio frame is determined by a parameter drxStartOffset which is configured by the eNB (3GPP TS 36.321, section 5.7 Discontinuous reception (DRX)). When this UE is configured to carry out inter-frequency measurements towards neighbor cells (e.g., pico cells) for the purpose of offloading, the eNB configures it with a sparse gap pattern and a measurement gap offset that is suitable given the long-DRX cycle in use (the ratio between the repetition period and the long-DRX cycle length corresponds to an integer power of 2). At least for one repetition period and one long-DRX cycle, the alignment shall be such that the start of the measurement gap burst falls within or is adjacent to the ON-duration, i.e., the beginning of the long-DRX cycle.

In the event that there is a repetition period starting in the current DRX cycle (long-DRX or short-DRX depending on which is active), the UE can be assumed to use at least one of the gaps in the burst regardless of whether the UE otherwise is scheduled or not by the eNB. Otherwise the UE is assumed to use all gaps encountered during activity.

For DRX cycles shorter than some threshold, say 160 ms as in legacy measurements (3GPP TS 36.133, 8.1.2.3 E-UTRAN inter frequency measurements), the UE is assumed from a measurement point of view to operate as if DRX had not been configured, i.e., as if it was active the whole time.

If only one DRX cycle is configured (e.g., short DRX cycle) by the network then the start of the "gap burst" is aligned with the ON duration of that DRX. The alignment between them can be, for example, within 40 milliseconds. This can also be achieved by a set of pre-defined rules such that UE always starts a gap burst within a certain subframe with respect to the DRX ON duration, e.g., 10 subframes.

The expression "UE is assumed to" has been used here to recognize that the number of gaps that are actually used may depend on the specific UE implementation. The measurement requirements shall, however, be based on the assumed radio time usage.

Embodiment 2

Configurable Gap Pattern

In this embodiment the gap pattern properties are configured by the eNB. Parameters such as the number of gaps in each measurement gap burst, and/or a repetition period for measurement gap bursts, and/or an instance in time between measurement gaps within a measurement gap burst are configured by the eNB. The repetition period may be aligned to a configured long-DRX cycle in the same manner as in embodiment 1. The ratio between the repetition period and the long-DRX cycle length can be restricted to an integer power of N (e.g., N=2) to secure alignment to ON-duration both in long-DRX and short-DRX cycles.

The network node (e.g., eNB) may use one or more criteria when selecting one or more parameters used for configuring the burst gap measurement pattern. Examples of criteria are:

The eNB may configure a pattern with shorter repetition period and/or more gaps in the burst when cell capacity limit is about to be reached and it is urgent to find cells for offloading to maintain a good user experience.

The eNB may also configure a pattern with shorter repetition period and/or more gaps in the burst when there are multiple carriers (e.g., 2 or more) to monitor for offloading purpose.

The eNB may configure the number of gaps and/or distance between the gaps in a burst depending on duplex mode and/or RAT on the target carrier for the offloading measurements. Having consecutive measurement gaps covering different parts of the radio frame of the target RAT may increase cell detection speed, particular for radio access technologies whose synchronization signals are sparse and repeating e.g., every 5 ms as for LTE E-UTRA and UTRA TDD 1.28 Mcps (TD-SCDMA).

The eNB may also configure a pattern with shorter repetition period and/or more gaps in the burst when radio conditions are more stringent or demanding. They are more stringent when the radio conditions change over time more quickly e.g., due to moderate or higher UE speed (e.g., 50-90 km/hr or more), multipath fading, larger delay spread, etc.

The eNB may also take into account a UE-recommended or UE-indicated values of the parameters as described below in the section titled "Embodiment 4."

Otherwise, that is, if none of the above criteria is met, then the UE may configure default set of parameters associated with the burst gap measurement pattern.

The shorter periodicity in the above examples may refer to 160 milliseconds or 320 milliseconds, for example, as opposed to a longer periodicity which may be 640 milliseconds or 1280 milliseconds, for example. References to "more gaps" in above examples may refer to 3-5 gaps per burst, for example, as opposed to a "few gaps," which might refer to 2-3 measurement gaps per burst.

Embodiment 3

Combination of Fixed and Configurable Gap Patterns

In this embodiment the same parameters and principles described in the sections titled "Embodiment 2" and "Embodiment 3" generally apply, e.g.:
the number of gaps in a burst, and/or
a repetition period for the burst, and/or
a distance in time between measurement gaps in a burst; and/or
a measurement gap offset However some of the parameters associated with the measurement patterns can be pre-defined, while others are configured by the network node.

Embodiment 4

UE Indication About Number of Gaps Per Bursts

According to this embodiment, the UE is adapted to indicate, to the network node, values for one or more of the parameters related to the 'burst gap pattern' required for doing the measurement in this burst gap measurement pattern (also known as a clustered gap measurement pattern or a clustered measurement gap pattern). The parameters may be any of those disclosed in the preceding sections, e.g., the number of gaps in a burst, a distance in time between gaps in a burst, etc.

The indication sent by the UE is a type of request or recommendation from the UE. For example, the UE may indicate the number of gaps in a burst (e.g., 2 gaps in a burst) that it needs for doing measurements on another carrier e.g., inter-frequency/Inter-RAT carrier. The UE may determine a parameter value depending upon the type of measurement (e.g., inter-frequency, inter-RAT or type of RAT such as GSM or UTRAN), number of carriers on which measurement is to be done, radio conditions, mobility state (e.g., UE speed, Doppler frequency), type of receiver it is equipped with for doing such measurements, etc. For example, in a channel with larger delay spread (e.g., 1 us or more) and/or at moderate or higher speed (e.g., 50-90 km/hr or above) the UE may require 3 gaps per burst; otherwise it may need only 2 gaps per burst.

A default setting may also be pre-defined. That is, if the UE does not indicate any recommended value of parameter then the network node serving the UE will assume that UE will use default value, e.g., number of gaps per burst=3 and gap pattern repetition of 640 milliseconds.

Based on this feedback received from the UE, the network node configures the measurement pattern while taking into account the UE indicated vales, e.g., number of gaps in each burst in a pattern, etc. The network node (e.g., eNB) may also take into account its own criteria (as described in the preceding sections) in addition to the UE recommendation when configuring the burst gap measurement pattern.

Embodiment 5

UE Capability Related to Gap Pattern

In this embodiment, the UE informs the network node that it supports the capability of using a burst gap measurement pattern (also known as a clustered gap measurement pattern) for doing measurements on inter-frequency and/or inter-RAT carriers.

The capability indication from the UEs is useful to the network because all UEs may not be capable of performing measurements on cells by using the clustered measurement gap pattern as disclosed herein. The UE may also signal additional information as part of the capability. The additional information may comprise of any one or more of the following:
  That the UE can use the burst gap measurement pattern only for doing certain kind of measurements e.g., inter-frequency measurements;
  That the UE can use the burst gap measurement pattern only for doing measurements in certain kind of network deployment scenarios e.g., in heterogeneous network, for offloading or cell change from HPN to LPN;
  That the UE can also recommend one or more parameters related to the burst gap measurement pattern.

The UE may send the above mentioned capability information to the network node in any of the following manners:
  Proactive reporting without receiving any explicit request from the network node (e.g., serving or any target network node);
  Reporting upon receiving any explicit request from the network node (e.g., serving or any target network node);
  The explicit request can be sent to the UE by the network anytime or at any specific occasion. For example the request for the capability reporting can be sent to the UE during initial setup or after a cell change (e.g., handover, RRC connection re-establishment, RRC connection release with redirection, PCell change in CA, PCC change in PCC, etc.).

The network node (e.g., a serving eNode B, a BS, a positioning node, a relay, an RNC, a BSC, etc.) may use the received UE capability information for performing one or more radio operational tasks related to measurement configuration, etc. In general the network node may adapt the parameters sent in the measurement configuration to the UE, e.g., values of the parameters in the burst gap measurement pattern. For example if the UE does not support this capability then the network node does not use configure the UE to perform measurement on a carrier that is used for offloading the HPN. Depending upon the capability information received at the network node, the network may also configure the UE to perform specific measurements (e.g., inter-frequency and/or inter-RAT measurements.

The network node may also forward the received UE capability information to other network node e.g., to neighboring radio network node, SON, etc. This will avoid the need for the UE to again signal its capability to a new serving radio node after the cell change e.g., after handover. In this way, signaling overheads can be reduced.

Example Process Flows

Figure 4:
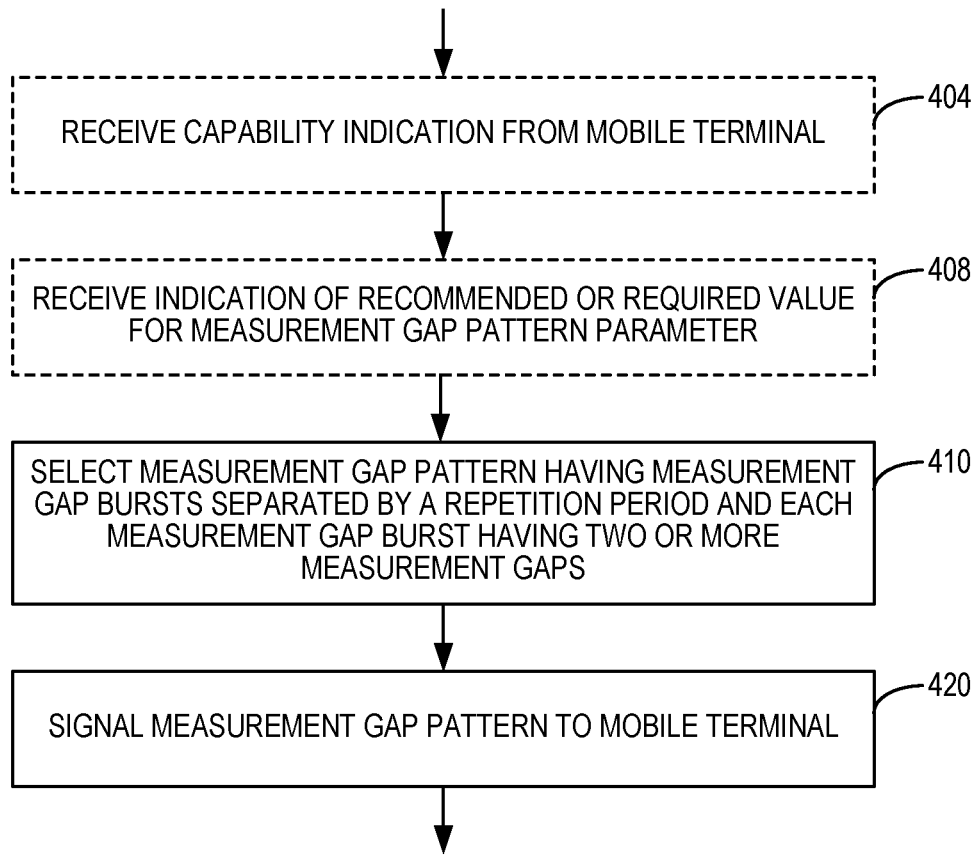
FIG. 4 is a process flow diagram illustrating an example method according to the techniques described herein.

FIG. 4 is a process flow diagram illustrating a generalized method, suitable for implementation in a network node of a wireless communication network and corresponding to several of the embodiments detailed above.

As shown at block 410, the illustrated method includes selecting a measurement gap pattern to be used by the mobile terminal, the measurement gap pattern having a series of measurement gap bursts such that the measurement gap bursts are separated by a repetition period and each measurement gap burst comprises two or more measurement gaps. As shown at block 420, the method continues with signaling the measurement gap pattern to the mobile terminal.

In some embodiments, selecting the measurement gap pattern comprises selecting the repetition period or selecting a number of measurement gaps for each measurement gap burst, or both. This may be based, for example, on a cell capacity limit for a serving cell for the mobile terminal, and/or on one or more of: a number of carrier frequencies on which the mobile terminal has to perform measurements; a type of measurement; a frequency of gaps in a burst; a type of DRX cycle; a length of DRX cycle; and radio channel conditions.

In some embodiments, the repetition period may be selected such that the selected repetition period is an integer multiple of a long-DRX cycle length for the mobile terminal. In some of these embodiments, the repetition period may be selected such that a ratio of the selected repetition period to a long-DRX cycle length for the mobile terminal is an integer power of 2.

In some embodiments, the method further includes selecting a measurement gap pattern offset for the measurement gap pattern and signaling the measurement gap pattern offset to the mobile terminal, where selecting the measurement gap pattern offset comprises choosing the measurement gap pattern offset so that an initial measurement gap in a measurement gap burst is adjacent to or overlapping with an On-duration interval of a long-DRX cycle for the mobile terminal.

In some embodiments, signaling the measurement gap pattern to the mobile terminal comprises sending the mobile terminal an identifier corresponding to one of two or more predefined measurement patterns known to the mobile terminal. In other embodiments, the mobile terminal is sent an indicator of one or more of the following: a number of gaps in a burst; a distance in time between measurement gaps in a burst; a repetition period between bursts; and a measurement gap offset.

In some embodiments, the method illustrated in FIG. 4 may further include receiving an indication from the mobile terminal, the indication from the mobile terminal indicating a recommended or required value for one or more of a number of gaps in a burst, a distance in time between measurement gaps in a burst, a repetition period between bursts, and a measurement gap offset. This is shown at block 408, which is illustrated with a dashed outline to indicate that this step is "optional" in the sense that it may not appear in every embodiment or occur in every instance. In these embodiments, selecting the measurement gap pattern may be based on the indication received from the mobile terminal.

In some of these and in some other embodiments, the example method summarized above may further comprise receiving a capability indication from the mobile terminal, the capability indication indicating that the mobile terminal is at least capable of performing one or more measurements using the measurement gap pattern having a series of measurement gap bursts such that the measurement gap bursts are separated by a repetition period and each measurement gap burst comprises two or more measurement gaps. This is shown at block 404, which is also illustrated with a dashed outline to indicate that it may not appear in every embodiment of the illustrated embodiment, or that it may not occur every time the illustrated method is performed. In these embodiments, the selecting of the measurement gap pattern and the signaling of the measurement gap pattern to the mobile terminal are in response to receiving the capability indication.

Figure 5:
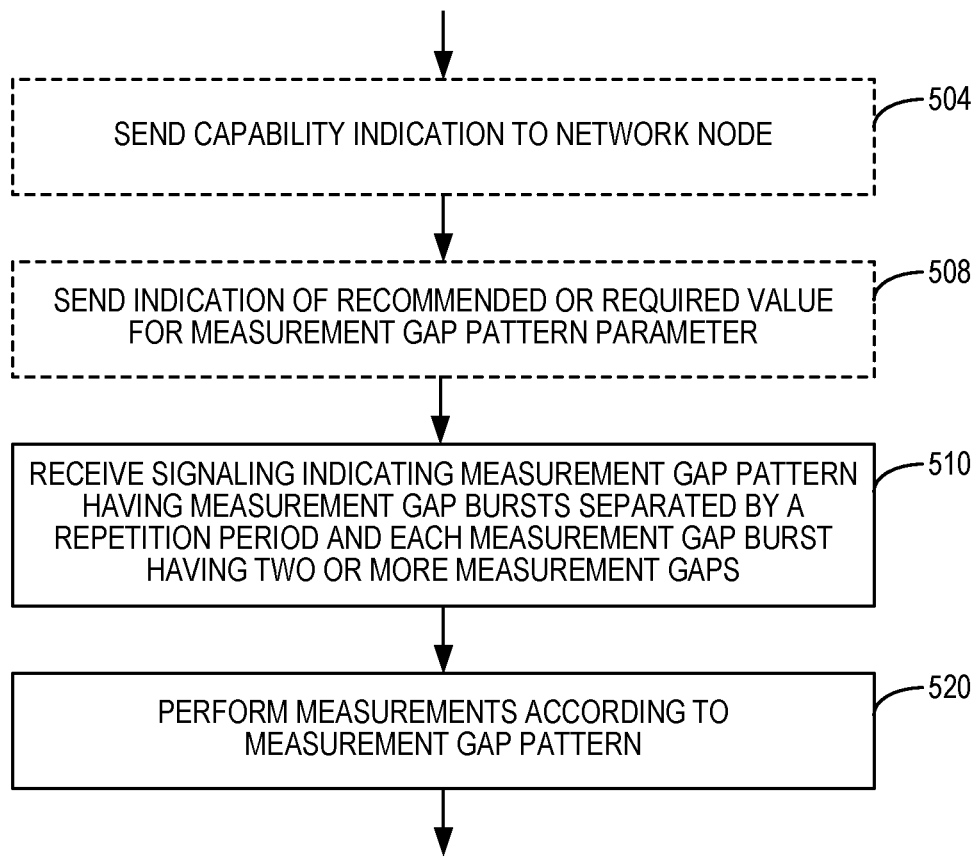
FIG. 5 is a process flow diagram illustrating another example method according to the techniques described herein.

A related process flow diagram according to the techniques disclosed herein is shown in FIG. 5, and is suitable for implementation in a mobile terminal operating in a wireless communication network and served by a first cell operating on a first carrier frequency. The illustrated method includes receiving signaling indicating a measurement gap pattern to be used by the mobile terminal, as shown at block 510. The measurement gap pattern has a series of measurement gap bursts such that the measurement gap bursts are separated by a repetition period and each measurement gap burst comprises two or more measurement gaps. As shown at block 520, the method further includes performing one or more measurements on at least one cell on a second carrier frequency according to the signaled measurement gap pattern. In some embodiments, the measurements performed on at least one cell operating on the second carrier frequency are offloading measurements, and the offloading measurements are performed by the UE regardless of the signal quality of measurements performed by the UE on the first cell.

In some embodiments, the signaled measurement gap pattern has a repetition period that is an integer multiple of a long-DRX cycle length for the mobile terminal. In some of these embodiments, a ratio of the repetition period to a long-DRX cycle length for the mobile terminal is an integer power of 2.

In some embodiments, the mobile terminal receives signaling indicating the measurement gap pattern by receiving an identifier corresponding to one of two or more predefined measurement patterns known to the mobile terminal. In other embodiments, the mobile terminal receives an indicator of one or more of the following: a number of gaps in a burst; a distance in time between measurement gaps in a burst; a repetition period between bursts; and a measurement gap offset.

In some embodiments, the mobile terminal first sends an indication to a network node in the wireless communication network, the indication indicating a recommended or required value for one or more of a number of gaps in a burst, a distance in time between measurement gaps in a burst, a repetition period between bursts, and a measurement gap offset. This is shown at block 508, which is shown with a dashed outline to indicate that it may not appear in every embodiment or every instance of the illustrated method.

In some of these and in some other embodiments, the mobile terminal sends a capability indication to a network node in the wireless communication network, as shown at block 504. This is shown at block 504, which has a dashed outline to indicate that the step is "optional" in the sense discussed above. The capability indication indicates that the mobile terminal is at least capable of performing one or more measurements using the measurement gap pattern having a series of measurement gap bursts such that the measurement gap bursts are separated by a repetition period and each measurement gap burst comprises two or more measurement gaps.

Example Hardware Implementations

Figure 6:
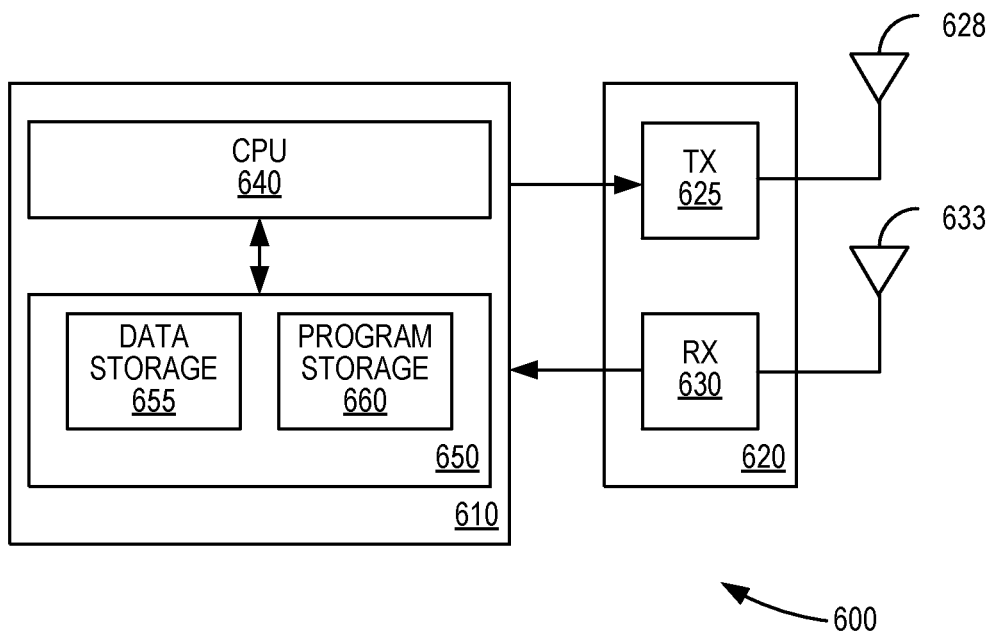
FIG. 6 is a block diagram showing components of an example mobile terminal as described herein.

Several of the techniques and methods described above may be implemented using radio circuitry and electronic data processing circuitry provided in a mobile terminal. FIG. 6 illustrates features of an example mobile terminal 600 according to several embodiments of the present invention. Mobile terminal 600, which may be a UE configured for dual-connectivity operation with an LTE wireless communication network (E-UTRAN), for example, comprises a radio transceiver circuit 620 configured to communicate with one or more base stations as well as a processing circuit 610 configured to process the signals transmitted and received by the transceiver unit 620. Transceiver circuit 620 includes a transmitter 625 coupled to one or more transmit antennas 628 and receiver 630 coupled to one or more receiver antennas 633. The same antenna(s) 628 and 633 may be used for both transmission and reception. Receiver 630 and transmitter 625 use known radio processing and signal processing components and techniques, typically according to a particular telecommunications standard such as the 3GPP standards for LTE. Note also that transmitter circuit 620 may comprise separate radio and/or baseband circuitry for each of two or more different types of radio access network, such as radio/baseband circuitry adapted for E-UTRAN access and separate radio/baseband circuitry adapted for Wi-Fi access. The same applies to the antennas—while in some cases one or more antennas may be used for accessing multiple types of networks, in other cases one or more antennas may be specifically adapted to a particular radio access network or networks. Because the various details and engineering tradeoffs associated with the design and implementation of such circuitry are well known and are unnecessary to a full understanding of the invention, additional details are not shown here.

Processing circuit 610 comprises one or more processors 640 coupled to one or more memory devices 650 that make up a data storage memory 655 and a program storage memory 660. Processor 640, identified as CPU 640 in FIG. 6, may be a microprocessor, microcontroller, or digital signal processor, in some embodiments. More generally, processing circuit 610 may comprise a processor/firmware combination, or specialized digital hardware, or a combination thereof. Memory 650 may comprise one or several types of memory such as read-only memory (ROM), random-access memory, cache memory, flash memory devices, optical storage devices, etc. Because terminal 600 supports multiple radio access networks, processing circuit 610 may include separate processing resources dedicated to one or several radio access technologies, in some embodiments. Again, because the various details and engineering tradeoffs associated with the design of baseband processing circuitry for mobile devices are well known and are unnecessary to a full understanding of the invention, additional details are not shown here.

Typical functions of the processing circuit 610 include modulation and coding of transmitted signals and the demodulation and decoding of received signals. In several embodiments of the present invention, processing circuit 610 is adapted, using suitable program code stored in program storage memory 660, for example, to carry out one of the techniques described above for receiving measurement gap pattern information and performing measurements accordingly. Of course, it will be appreciated that not all of the steps of these techniques are necessarily performed in a single microprocessor or even in a single module.

Figure 7:
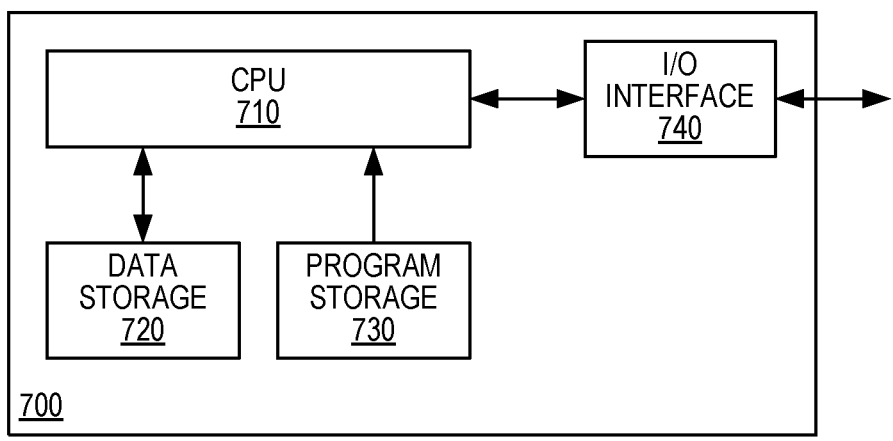
FIG. 7 is a block diagram illustrating an example network node apparatus, according to the presently disclosed techniques.

Similarly, several of the techniques and processes described above can be implemented in a network node, such as an eNodeB or other node in a 3GPP network. FIG. 7 is a schematic illustration of a network node apparatus 700 in which a method embodying any of the presently described network-based techniques can be implemented. A computer program for controlling the node 700 to carry out a method embodying the present invention is stored in a program storage 730, which comprises one or several memory devices. Data used during the performance of a method embodying the present invention is stored in a data storage 720, which also comprises one or more memory devices. During performance of a method embodying the present invention, program steps are fetched from the program storage 730 and executed by a Central Processing Unit (CPU) 710, retrieving data as required from the data storage 720. Output information resulting from performance of a method embodying the present invention can be stored back in the data storage 720, or sent to a communications interface circuit 740, which includes circuits configured to send and receive data to and from other network nodes and which may also include a radio transceiver configured to communicate with one or more mobile terminals.

Accordingly, in various embodiments of the invention, processing circuits, such as the CPU 710 and memory circuits 720 and 730 in FIG. 7, are configured to carry out one or more of the techniques described in detail above. Likewise, other embodiments may include base stations and/or radio network controllers that include one or more such processing circuits. In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module.

It will be appreciated by the person of skill in the art that various modifications may be made to the above described embodiments without departing from the scope of the present invention. For example, although embodiments of the present invention have been described with examples that include a communication system compliant to the 3GPP-specified LTE standards, it should be noted that the solutions presented may be equally well applicable to other networks that support dual connectivity. The specific embodiments described above should therefore be considered exemplary rather than limiting the scope of the invention. Because it is not possible, of course, to describe every conceivable combination of components or techniques, those skilled in the art will appreciate that the present invention can be implemented in other ways than those specifically set forth herein, without departing from essential characteristics of the invention. The present embodiments are thus to be considered in all respects as illustrative and not restrictive.

In the present description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) running on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure, and shall not be restricted or limited by the foregoing detailed description.

What is claimed is:

1. A method, in a network node of a wireless communication network, for configuring measurements in a mobile terminal, the method comprising:
    selecting a measurement gap pattern to be used by the mobile terminal, the measurement gap pattern having a series of measurement gap bursts such that the measurement gap bursts are separated by a repetition period of 1280 milliseconds and each measurement gap burst comprises two or more measurement gaps separated by a measurement gap repetition period of 40 or 80 milliseconds; and
    signaling the measurement gap pattern to the mobile terminal;
wherein selecting the measurement gap pattern comprises selecting a non-zero number of measurement gaps for each measurement gap burst such that which non-zero number is selected is based on a duplex mode for the mobile terminal and/or based on the radio access technology (RAT) of a target carrier for offloading measurements by the mobile terminal.

2. The method of claim 1, wherein selecting the non-zero number of measurement gaps for each measurement gap burst is further based on one or more of:
    a number of carrier frequencies on which the mobile terminal has to perform measurements;
    a type of measurement;
    a frequency of gaps in a burst;
    a type of DRX cycle;
    a length of DRX cycle; and
    radio channel conditions.

3. The method of claim 1, further comprising selecting a measurement gap pattern offset for the measurement gap pattern and signaling the measurement gap pattern offset to the mobile terminal, wherein selecting the measurement gap pattern offset comprises choosing the measurement gap pattern offset so that an initial measurement gap in a measurement gap burst is adjacent to or overlapping with an On-duration interval of a long-DRX cycle for the mobile terminal.

4. The method of claim 1, wherein signaling the measurement gap pattern to the mobile terminal comprises sending the mobile terminal an identifier corresponding to one of two or more predefined measurement patterns known to the mobile terminal.

5. The method of claim 1, wherein signaling the measurement gap pattern to the mobile terminal comprises sending the mobile terminal an indicator of one or more of the following:
    a number of gaps in a burst;
    a distance in time between measurement gaps in a burst;
    a repetition period between bursts; and
    a measurement gap offset.

6. The method of claim 1, the method further comprising receiving an indication from the mobile terminal, the indication from the mobile terminal indicating a recommended or required value for one or more of:
    a number of gaps in a burst,
    a distance in time between measurement gaps in a burst,
    a repetition period between bursts, and
    a measurement gap offset,
wherein selecting the measurement gap pattern is based on the indication from the mobile terminal.

7. The method of claim 1, the method further comprising receiving a capability indication from the mobile terminal, the capability indication indicating that the mobile terminal is at least capable of performing one or more measurements using the measurement gap pattern having a series of measurement gap bursts such that the measurement gap bursts are separated by a repetition period and each measurement gap burst comprises two or more measurement gaps, wherein selecting the offloading measurement gap pattern and signaling the measurement gap pattern to the mobile terminal are in response to receiving the capability indication.

8. The method of claim 1, wherein the selecting of the non-zero number of measurement gaps for each measurement burst is such that which non-zero number is selected is based on a determination of whether the capacity limit for the cell serving the mobile terminal has been reached.

9. A method, in a mobile terminal operating in a wireless communication network and served by a first cell operating on a first carrier frequency, for performing measurements, the method comprising:
receiving signaling indicating a measurement gap pattern to be used by the mobile terminal for inter-frequency measurements, the measurement gap pattern having a series of measurement gap bursts such that the measurement gap bursts are separated by a repetition period of 1280 milliseconds and each measurement gap burst comprises two or more measurement gaps separated by a measurement gap repetition period of 40 or 80 milliseconds, wherein the number of measurement gaps for each measurement gap burst is based on a duplex mode for the mobile terminal and/or based on the radio access technology (RAT) of a target carrier for offloading measurements by the mobile terminal; and
performing one or more measurements on at least one cell on a second carrier frequency according to the signaled measurement gap pattern.

10. The method of claim 9, wherein receiving signaling indicating the measurement gap pattern comprises receiving an identifier corresponding to one of two or more predefined measurement patterns known to the mobile terminal.

11. The method of claim 9, wherein receiving signaling indicating the measurement gap pattern comprises receiving an indicator of one or more of the following:
a number of gaps in a burst;
a distance in time between measurement gaps in a burst;
a repetition period between bursts; and
a measurement gap offset.

12. The method of claim 9, the method further comprising first sending, to a network node in the wireless communication network, an indication, the indication indicating a recommended or required value for one or more of:
a number of gaps in a burst,
a distance in time between measurement gaps in a burst,
a repetition period between bursts, and
a measurement gap offset.

13. The method of claim 9, the method further comprising sending a capability indication to a network node in the wireless communication network, the capability indication indicating that the mobile terminal is at least capable of performing one or more measurements using the measurement gap pattern having a series of measurement gap bursts such that the measurement gap bursts are separated by a repetition period and each measurement gap burst comprises two or more measurement gaps.

14. The method of claim 9, wherein the measurements performed on at least one cell operating on the second carrier frequency are offloading measurements, and wherein the offloading measurements are performed by the UE regardless of the signal quality of measurements performed by the UE on the first cell.

15. A network node apparatus comprising a communications interface circuit configured to communicate with a mobile terminal or to communicate with one or more other network nodes, or configured to communicate with the mobile terminal and one or more other network nodes, and further comprising a processing circuit, wherein the processing circuit is configured to:
select a measurement gap pattern to be used by the mobile terminal, the measurement gap pattern having a series of measurement gap bursts such that the measurement gap bursts are separated by a repetition period of 1280 milliseconds and each measurement gap burst comprises two or more measurement gaps separated by a measurement gap repetition period of 40 or 80 milliseconds; and
signal the measurement gap pattern to the mobile terminal, either directly or via one or more other network nodes, using the communications interface circuit;
wherein the processing circuit is configured to select a non-zero number of measurement gaps for each measurement gap burst such that which non-zero number is selected is based on a duplex mode for the mobile terminal and/or based on the radio access technology (RAT) of a target carrier for offloading measurements by the mobile terminal.

16. The network node apparatus of claim 15, wherein the processing circuit is configured to select the non-zero number of measurement gaps for each measurement burst such that which non-zero number is selected based on a determination of whether the capacity limit for the cell serving the mobile terminal has been reached.

17. A mobile terminal configured for operation in a wireless communication network, the mobile terminal comprising a radio transceiver circuit configured to communicate with a radio network node in the wireless communication network and further comprising a processing circuit, wherein the processing circuit is configured to:
receive signaling indicating a measurement gap pattern to be used by the mobile terminal for inter-frequency measurements, the measurement gap pattern having a series of measurement gap bursts such that the measurement gap bursts are separated by a repetition period of 1280 milliseconds and each measurement gap burst comprises two or more measurement gaps separated by a measurement gap repetition period of 40 or 80 milliseconds, wherein the number of measurement gaps for each measurement gap burst is based on a duplex mode for the mobile terminal and/or based on the radio access technology (RAT) of a target carrier for offloading measurements by the mobile terminal; and
perform measurements according to the signaled measurement gap pattern.

* * * * *